J. S. ALLEN.
SCALE.
APPLICATION FILED DEC. 3, 1910.

993,216.

Patented May 23, 1911.

2 SHEETS—SHEET 1.

Witnesses

Edwin F. McKee

Inventor
Jonathan S. Allen

By Victor J. Evans
Attorney

J. S. ALLEN.
SCALE.
APPLICATION FILED DEC. 3, 1910.

993,216.

Patented May 23, 1911.

2 SHEETS—SHEET 2.

Witnesses
Edwin G. McKee

Inventor
Jonathan S. Allen
By Victor J. Evans
Attorney

UNITED STATES PATENT OFFICE.

JONATHAN S. ALLEN, OF NEWCASTLE, INDIANA.

SCALE.

993,216.   Specification of Letters Patent.   Patented May 23, 1911.

Application filed December 3, 1910. Serial No. 595,406.

*To all whom it may concern:*

Be it known that I, JONATHAN S. ALLEN, a citizen of the United States, residing at Newcastle, in the county of Henry and State of Indiana, have invented new and useful Improvements in Scales, of which the following is a specification.

The invention relates to scales, and more particularly to the class of pitless platform scales.

The primary object of the invention is the provision of a scale in which the platform thereof is mounted in the stationary frame of a scale, whereby it will have free movement either longitudinally or laterally of the said frame, without dislocating the bearings of the rocking shafts or those of the platform when a team is driven onto the latter.

Another object of the invention is the provision of a scale in which the rocking shafts supporting the platform of said scale are hung in stirrups which are adapted for movement either laterally or longitudinally of the stationary frame of the scale, thereby preventing undue wear upon the bearings and obviating dislocation of the adjunct parts of the scale.

A further object of the invention is the provision of a scale in which the bearings thereof are protected from dust or dirt, thereby prolonging the life of the same, the bearings being of chilled steel, thus increasing the wear thereof and reducing friction to a minimum.

A still further object of the invention is the provision of a scale in which the platform is suspended, whereby it may freely move when a wagon or other load is placed thereon, without possibility of the derangement of the adjunct parts of the scale.

A still further object of the invention is the provision of a scale which is simple in construction, strong, durable and inexpensive in manufacture.

With these and others objects in view, the invention consists in the construction, combination and arrangement of parts, as will be hereinafter more fully described, illustrated in the accompanying drawings, and pointed out in the claims hereunto appended.

Figure 1:
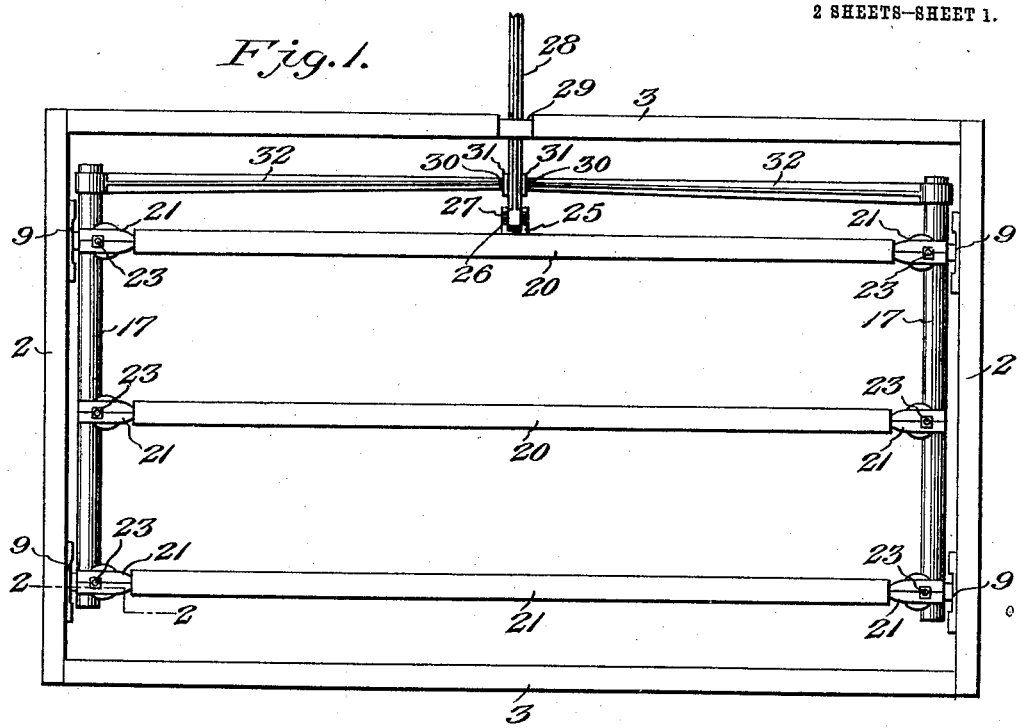
Figure 2:
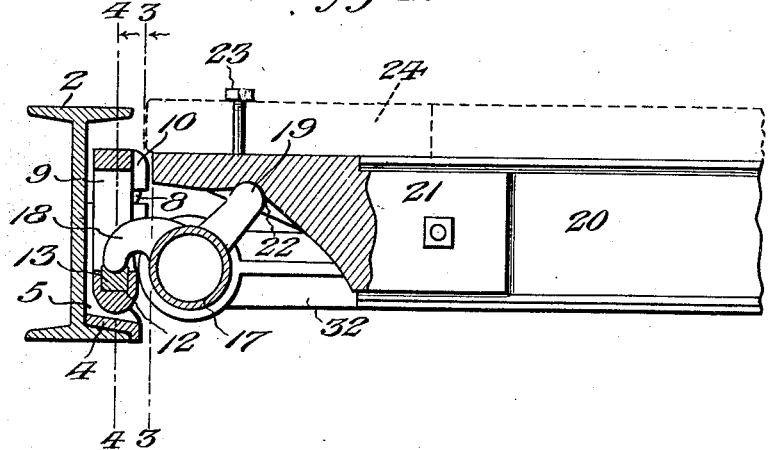
Figure 3:
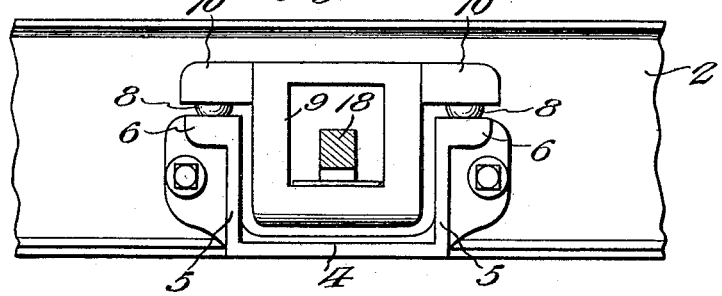
Figure 4:
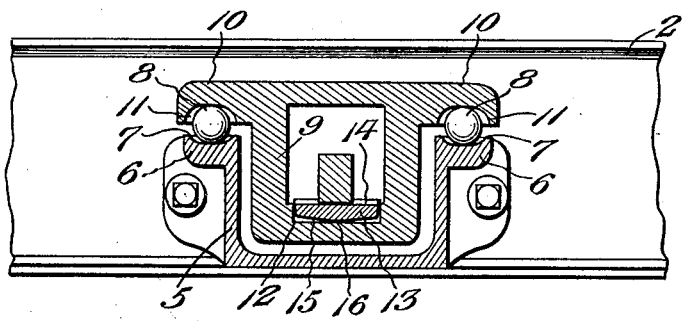
Figure 5:
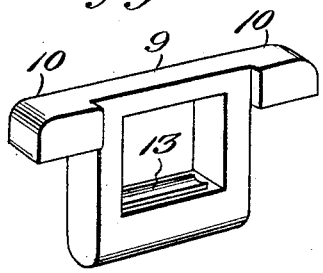
Figure 6:
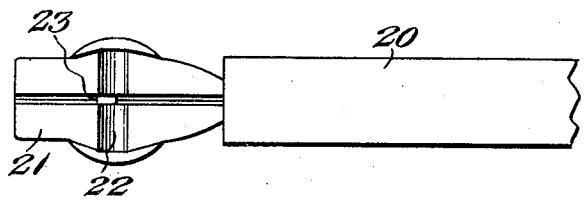

In the drawings: Figure 1 is a top plan view of a pitless platform weighing scale constructed in accordance with the invention, with the platform boarding omitted.
Fig. 2 is a sectional view on the line 2—2 of Fig. 1. Fig. 3 is a sectional view on the line 3—3 of Fig. 2. Fig. 4 is a sectional view on the line 4—4 of Fig. 1. Fig. 5 is a detail perspective view of the stirrups removed from the scale. Fig. 6 is a fragmentary bottom plan view of one of the platform beams.

Similar reference characters indicate corresponding parts throughout the several views of the drawings.

Referring to the drawings by numerals, 2 designates the spaced parallel channeled end beams or irons, and 3 the spaced parallel side channeled beams or irons of a stationary scale frame, the ends of the said beams being suitably united to form a unitary structure. The said ends of the beams at their lower bearing flanges are cut at an angle of 45°, so as to abut together when the beams have been joined.

Secured to the inner faces of the end beams 2 are spaced alining castings forming chairs 4, the same being provided with right angular upstanding webs 5, the upper ends of which terminate in laterally extending bearings 6, the upper faces thereof being formed with elongated race-ways 7, in which engage bearing balls 8 supporting stirrups, as will be hereinafter more fully described.
These stirrups each comprise a casting forming a yoke 9 provided at opposite sides thereof with laterally extending bearing ears 10, the lower faces of which contain elongated race-ways 11 which engage the bearing balls 8 and when the said stirrups are mounted to rest upon the bearing balls 8, they will be suspended thereby within the chairs. Thus, it will be seen that the said stirrups may have free lateral movement in the chairs 4, and also may swing longitudinally of the scale frame, for a purpose as will be hereinafter more fully described.

Formed in the inner faces of the lower horizontal portions of the yokes 9 of the stirrups are elongated pockets 12, in each of which is loosely fitted a bearing block 13, the same being preferably constructed from chilled steel and is provided in its upper face with a concave longitudinal channel 14, while its lower face is reversely beveled, as at 15, to form a medial fulcrum apex 16 which rests upon the bed or bottom of the pocket 12, and engaged with these bearing blocks 13 are the arms of rocking shafts, as will be hereinafter more fully described.

Arranged parallel with the end beams 2 of the scale frame are the rocking shafts 17, each being formed with outwardly projecting hanger lugs or arms 18, which, at their free ends, engage and rest in the channels 14 of the bearing blocks 13 carried by the stirrups. Also formed on these rocking shafts 17 are outwardly extending lever arms 19, the same being projected in an opposite direction with respect to the arms 18, and which engage the ends of spaced platform joists or irons 20, each being provided with bearing brackets 21 at opposite ends thereof which contain pockets 22 receiving the free ends of the lever arms 19, whereby on the rocking of the said shafts 17, the free ends of the arms will turn in the pockets 22, thus permitting the lowering of the platform bolsters or irons 20 when the scale is being operated.

Embedded in the joists 20 and rising therefrom near opposite ends thereof are bolt members 23, the same being passed through the platform boarding 24 for securing the platform of the scale superimposed upon the joists and held fast thereon, the platform being constructed in the ordinary well-known manner.

Suitably fixed centrally to one of the outer joists 20 supporting the platform of the scale, is a bracket 25, the latter being provided with bearing cavities 26 receiving the bearings 27 of a cross lever or arm 28, such cross lever being adapted for connection with the scale beam in the usual or any preferred manner, the contiguous side beam 3 of the frame being provided with a suitable opening 29, through which said lever 28 extends.

Integral with and projecting from opposite sides of the cross arm or lever 28 are supporting lugs 30, from which hang stirrups 31 forming bearings for the contiguous ends of a pair of arms 32 secured rigidly, as shown, or in any other suitable manner, to the rocking shafts 17, whereby the latter may be actuated when a load is placed upon the scale platform, so that the scale will determine the weight of such load.

In practice, a team is driven over the platform in the usual manner until the wagon or other vehicle to be weighed is disposed upon it, and when the team moves onto the said platform, it causes the vibrating of the platform either longitudinally or laterally of the scale frame, but by reason of the employment of the stirrups which are hung upon the bearing balls 8 held within the race-ways 7 in the chairs 4 fixed to the frame, the friction by reason of the vibration will be reduced to a minimum and at the same time, free movement of the platform will be attained without dislocating or in any way injuring the adjunct parts of the scale.

It will be evident that by reason of the formation of the bearing ears 10 on the yokes 9 of the stirrups, the bearing balls 8 will be protected or shielded from dirt or foreign matter that would otherwise accumulate in the race-ways. Also by the formation of the bracket 21 at the ends of the joists of the platform scale, the lever arms 19 of the rocking shafts will be protected from dirt or other foreign matter. Furthermore, the bearing blocks 13 may be readily removed from the stirrups should the same wear to any extent that would impede the balancing of the scale when in use, and in this manner new bearing blocks may be placed in their stead.

From the foregoing, it is thought that the construction and operation of the invention will be readily understood without requiring a more extended explanation, and therefore the same has been omitted.

What is claimed is:

1. The combination with a scale frame and platform, of chairs fixed to the frame and having channeled bearings, bearing balls loosely disposed in said bearings, stirrups having channeled bearings resting upon said bearing balls, removable bearing blocks carried by the stirrups, rock shafts having arms engaged in said bearing blocks, lever arms projecting from said rock shafts, and platform supporting joists having pocketed brackets engaged with said lever arms on the rock shafts.

2. The combination with the frame and platform of a scale, of chairs fixed to the frame, stirrups supported by the chairs for sliding and swinging movements, roller elements interposed between and frictionally engaging with the chairs and stirrups, removable bearing blocks carried by the stirrups, supporting joists fixed to the platform and having pocketed ends, and rock shafts having arms engaged with the bearing blocks and in the pockets of the joists.

3. The combination with the frame and platform of a scale, of chairs fixed to the frame, stirrups supported by the chairs for sliding and swinging movements, the said chairs and stirrups being provided with elongated registering race-ways, bearing balls engaged in said race-ways, removable bearing blocks carried by the stirrups, supporting joists fixed to the platform and having pocketed ends, rock shafts having arms engaged with the bearing blocks and in the pockets of the joists, and connections between the rock shafts and the balancing beam of a scale, whereby on the rocking of the shafts, such scale beam may be actuated.

In testimony whereof I affix my signature in presence of two witnesses.

JONATHAN S. ALLEN.

Witnesses:
B. B. MARLEY,
C. M. BROWN.

Copies of this patent may be obtained for five cents each, by addressing the "Commissioner of Patents, Washington, D. C."